United States Patent
D'Alo et al.

(10) Patent No.: US 7,685,147 B2
(45) Date of Patent: Mar. 23, 2010

(54) AUTOMATIC MANAGEMENT METHOD AND SYSTEM WITH CATEGORY-BASED CORRELATIONS

(75) Inventors: Salvatore D'Alo, Rome (IT); Alex Donatelli, Rome (IT); Claudio Marinelli, Aprilia (IT); Giovanni Lanfranchi, Piacenza (IT)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 10/845,831

(22) Filed: May 14, 2004

(65) Prior Publication Data
US 2004/0249842 A1     Dec. 9, 2004

(30) Foreign Application Priority Data
May 27, 2003   (EP)   .................................. 03368049

(51) Int. Cl.
*G06F 17/00* (2006.01)
*G06F 9/00* (2006.01)
*G06F 15/177* (2006.01)

(52) U.S. Cl. ........................... 707/102; 713/1; 709/220

(58) Field of Classification Search ................. 707/102; 705/14
See application file for complete search history.

(56) References Cited

U.S. PATENT DOCUMENTS 6,735,572 B2 *   5/2004   Landesmann ................. 705/14
6,978,273 B1 *   12/2005  Bonneau et al. ............. 707/102

* cited by examiner

*Primary Examiner*—Uyen T. Le
(74) *Attorney, Agent, or Firm*—Dillon & Yudell LLP (57) ABSTRACT

In an autonomic management method for self-configuring a subject entity in a data processing system, the subject entity retrieves, from a set of rules published by an authority entity, one or more rules corresponding at least one category of the subject entity. Each rule defines a desired state for a category, and at least one retrieved rule includes at least one formal parameter defining a correlation with at least one further category. For each retrieved rule, the subject entity resolves each formal parameter included in the retrieved rule by associating each further category specified in the formal parameter with at least one further subject entity belonging to the further category. The subject entity also applies the retrieved rule to configure the subject entity according to the desired state specified in the retrieved rule.

30 Claims, 9 Drawing Sheets

AUTOMATIC MANAGEMENT METHOD AND SYSTEM WITH CATEGORY-BASED CORRELATIONS

PRIORITY CLAIM

The present application claims priority to prior EPO application 03368049.7 filed May 27, 2003.

BACKGROUND OF THE INVENTION

1. Technical Field

The present invention relates to the data processing field, and more specifically to a management method and a corresponding system.

2. Description of the Related Art

Management of different types of resources (such as software components, applications or devices) is a critical issue in a data processing system with a distributed architecture. This problem is particular acute when the system includes a high number of logical and/or physical entities (subjects), each one directly controlling one or more resources; the problem is further exacerbated if the subjects have a high level of complexity or are dispersed across a large number of installations.

The management environments known in that art are based on an enforcement model (also known as master/slave model). In this model, the process is entirely controlled by an authority residing at a central site of the system. The authority defines a desired configuration of every subject. For this purpose, the authority accesses a central repository storing the (alleged) current configuration of each subject, and determines the management actions required to bring the subject to the desired configuration starting from the current configuration. The management actions are then enforced remotely by the authority on the subject (which is totally passive).

A drawback of the management environments known in the art is the lack of any kind of cooperation between the authority and the subjects. This lack of cooperation may bring about inconsistencies when the subjects are upgraded out of the control of the authority. Moreover, the solutions currently employed do not support the management of subjects that are temporarily unavailable or off-line. The known management environments require the authority to maintain information about the location of all the subjects; at the same time, the authority must handle the communication with every subject directly.

An additional problem arises when two or more different subjects are correlated to each other (for example, in a monitoring application an agent under control and a server collecting monitoring information). In the management environments known in the art, the correlation must be defined statically when a corresponding solution is deployed in the system. Therefore, the authority is able to establish the desired correlation only addressing the involved subjects directly at a physical level; for example, the authority must configure the monitoring agent so as to point to an address of the corresponding monitoring server.

This lack of flexibility is unacceptable in high dynamic environments in which the configuration of the subjects changes frequently. Moreover, the above-mentioned drawbacks greatly increase the complexity of any solution to be deployed in the system.

SUMMARY OF THE INVENTION

In at least one preferred embodiment, the present invention provides a management method that implements a self-adaptive model.

In at least one preferred embodiment of the present invention, the present invention defines correlations between different subjects dynamically.

In at least one preferred embodiment of the present invention, the present invention establishes correlations at a logical level.

The present invention can be implemented in a data processing system including a plurality of subject entities and at least one authority entity as an autonomic management method for self-configuring the subject entities, where each subject entity belongs to at least one of a plurality of categories. In at least one embodiment, the method includes the steps of: the at least one authority entity publishing a plurality of rules each one defining a desired state for a category, at least one of the rules including at least one formal parameter defining a correlation with at least one further category, each subject entity retrieving the rules corresponding to the at least one category of the subject entity, and for each retrieved rule resolving each formal parameter included in the retrieved rule by associating each further category specified in the formal parameter with at least one further subject entity belonging to the further category, and applying the retrieved rule to configure the subject entity according to the desired state specified in the retrieved rule.

The present invention also provides a computer program for performing the method, a corresponding computer program running on each subject entity, and program products storing those programs.

The present invention further provides a system implementing the method and a computer of the subject entity for use in the system.

The novel features believed to be characteristic of this invention are set forth in the appended claims. The invention itself, however, as well as these and other related objects and advantages thereof, will be best understood by reference to the following detailed description to be read in conjunction with the accompanying drawings.

BRIEF DESCRIPTION OF THE DRAWINGS

The novel features believed characteristic of the invention are set forth in the appended claims. However, the invention, as well as a preferred mode of use, will best be understood by reference to the following detailed description of an illustrative embodiment when read in conjunction with the accompanying drawings, wherein:

DETAILED DESCRIPTION OF ILLUSTRATIVE EMBODIMENT

Figure 1A:
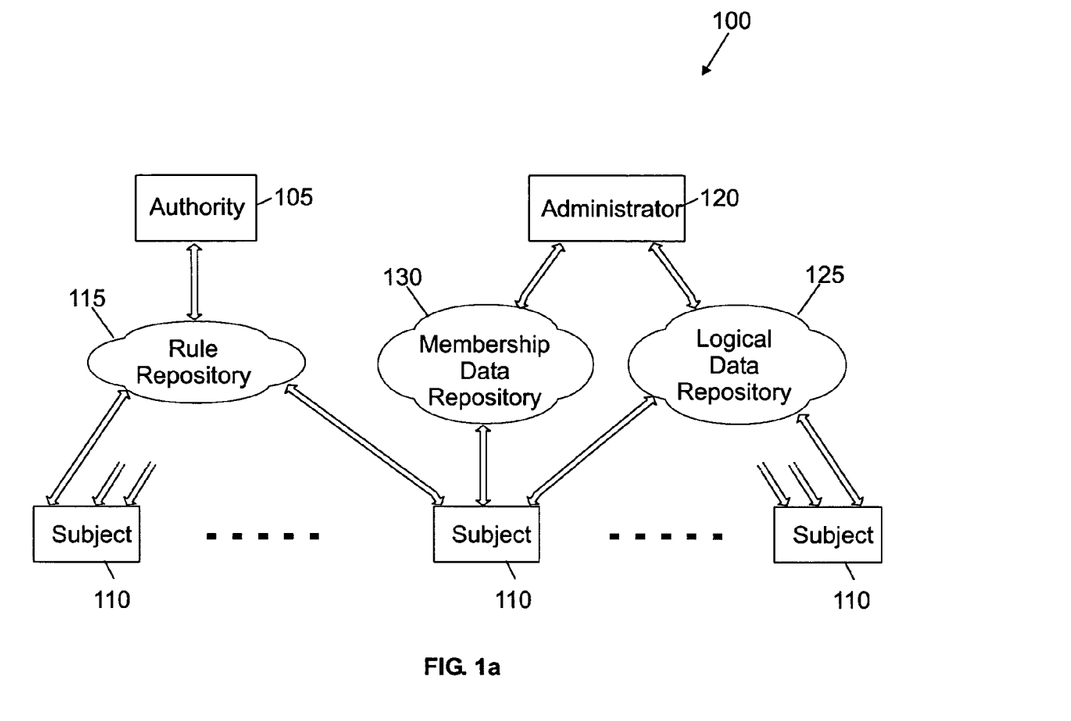
FIG. 1a is a schematic block diagram of a data processing system in which the management method of the present invention is applicable.

With reference now to the figures and, in particular, with reference to FIG. 1a, a data processing system 100 with a distributed (e.g., INTERNET-based) architecture is shown. The system 100 implements an environment for managing several kinds of resources, such as products in a software distribution application, in a monitoring application, and the like.

A computer 105 operates as an authority, which is responsible to define a desired configuration of the system 100. Multiple computers 110 operate as heterogeneous subjects, which directly control one or more instances of different resources under management. Each subject 110 is defined by one or more characteristics of logical and/or physical entities (such as a desktop, a Personal Digital Assistant (PDA), a SIM card of a mobile telephone, every user of a workstation, and the like).

The authority 105 and the subjects 110 communicate in an associative way (at the information level) through a shared repository 115. The repository 115 stores a set of rules (or laws). Each rule specifies a desired configuration for a category of subjects, defined according to their logical and/or physical characteristics; particularly, the desired configuration is characterized by a target state of each resource (which instances are controlled by the subjects belonging to the category associated with the rule). Moreover, the rule can include one or more formal parameters (or arguments), which are used to pass a value or a reference dynamically when the rule is applied on the corresponding subjects.

The formal parameter is either internal or external. An internal formal parameter defines an operational feature for the category specified in the rule; for example, the internal formal parameter is used to pass the name of an instance of a resource controlled by the subject (which instance matches the category of the rule). Conversely, an external parameter defines a correlation with one or more further categories (typically different from the category specified in the rule); for example, the external formal parameter is used to pass an IP address of another subject (belonging to the category of the formal parameter).

A computer 120 operates as an administrator, which is responsible to define the categories of the subjects 110 dynamically at a logical level. The information is available in a shared repository 125; the corresponding information stored in the logical data repository 125 is transmitted to every subject 110.

The subjects 110 communicate through an additional shared repository 130 (defining a virtual word implemented in the system 100); for each subject 110, the repository 130 stores membership information indicating the category of the subject and the compliance to the corresponding rules. The membership data repository 130 is further accessed by the administrator 120.

The above-described repositories implement a peer-to-peer communication model, which totally decouples the different entities of the system 100 (authority 105, subjects 110 and administrator 120). Particularly, a destination decoupling results from the fact that the entities do not need to refer to each other explicitly (thereby providing a fully anonymous communication scheme); in other words, a mutual knowledge of the location of the different entities is not necessary. Moreover, time decoupling results from the fact that the entities do not need to be available at the same time.

Figure 1B:
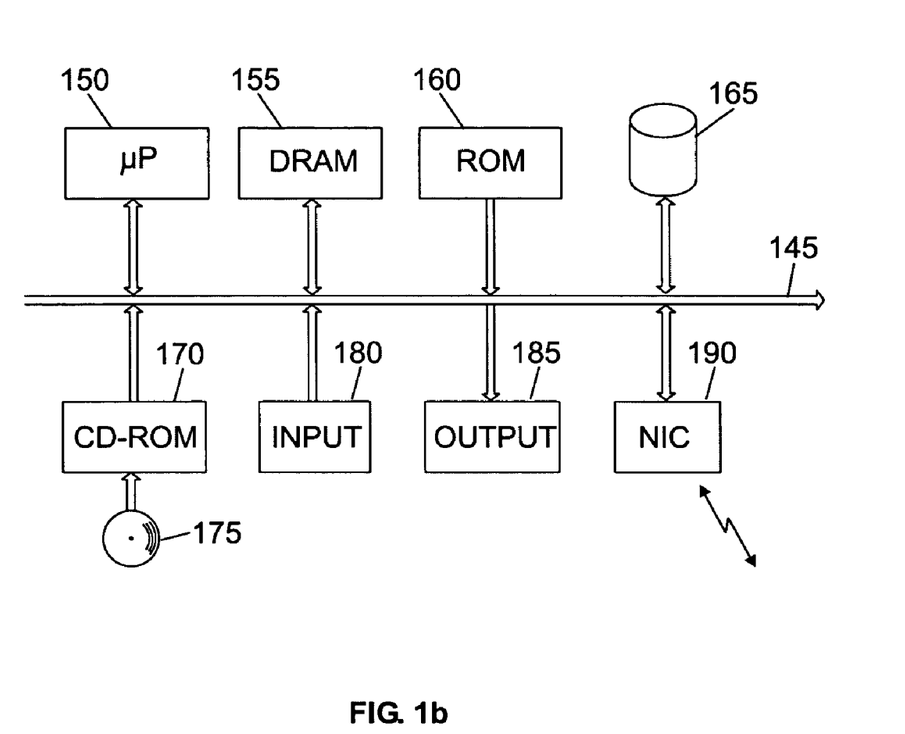
FIG. 1b depicts a functional block diagram of a generic computer of the system.

As shown in FIG. 1b, a generic computer of the system (authority, subject, or administrator) is formed by several units that are connected in parallel to a communication bus 145. In detail, one or more microprocessors (μP) 150 control operation of the computer, a DRAM 155 is directly used as a working memory by the microprocessor(s) 150, and a ROM 160 stores basic code for a bootstrap of the computer.

Several peripheral units are further connected to the bus 145 (by means of respective interfaces). Particularly, a mass memory consists of a magnetic hard-disk 165 and a driver 170 for reading CD-ROMs 175. Moreover, the computer includes input devices 180 (for example, a keyboard and a mouse), and output devices 185 (for example, a monitor and a printer). A Network Interface Card (NIC) 190 is used to connect the computer into the system.

However, the concepts of the present invention are also applicable when the management environment is implemented in an equivalent data processing system (for example, based on a LAN), or when different resources and entities are envisaged. Similar considerations apply if the computers have another structure or include equivalent units. Alternatively, two or more authorities and/or administrators are provided, the authority and the administrator consist of a single entity, or the shared repositories are implemented with one or more equivalent memory spaces.

Figure 2:
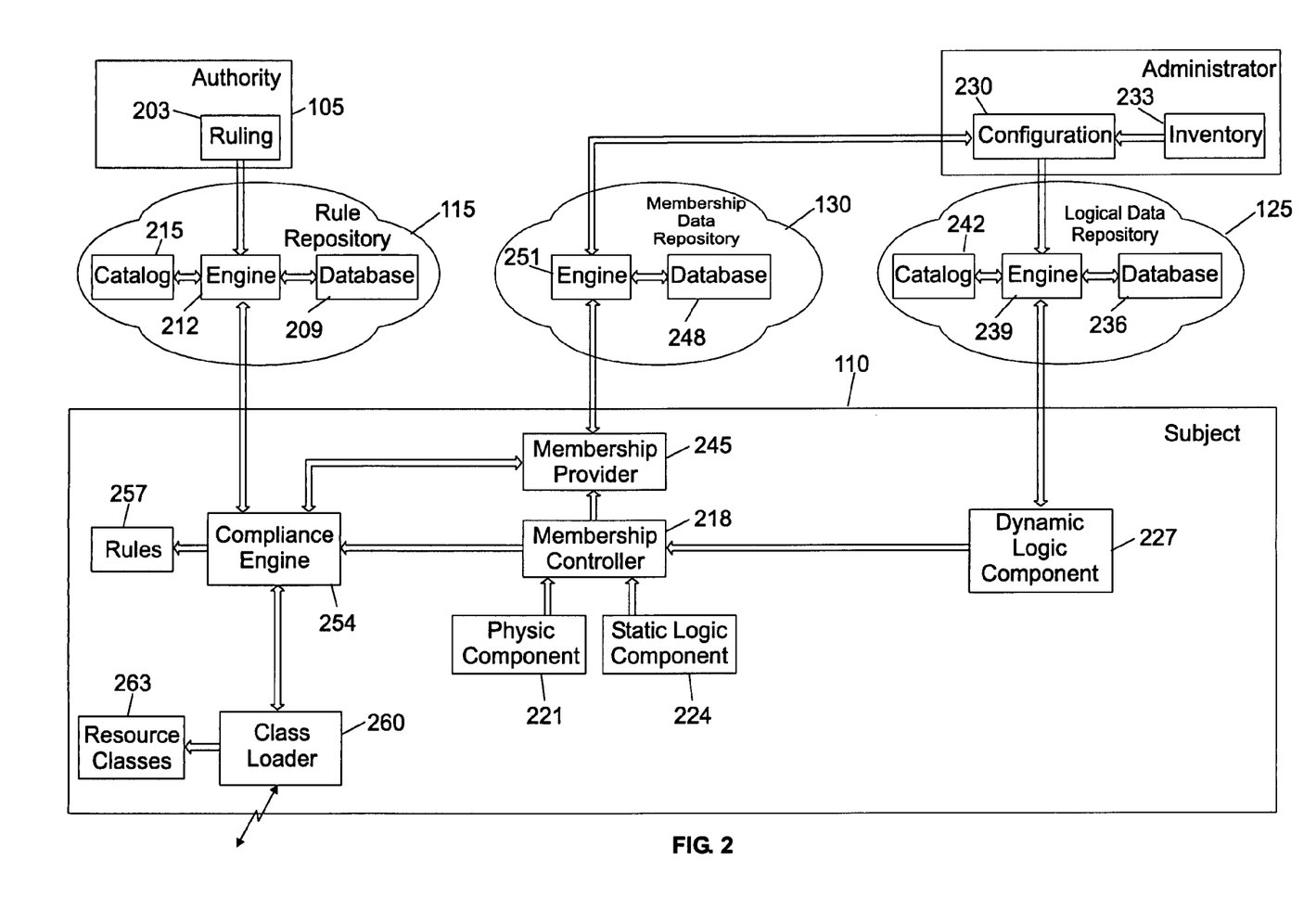
FIG. 2 illustrates the main software component employed by the management method.

Considering now FIG. 2, the main software components used in the management environment described above are illustrated. The information (programs and data) is typically stored on the respective hard disks and loaded (at least partially) into the working memories when the programs are running, together with an operating system and other application programs (not shown in the figure). The programs are initially installed onto the hard disks from CD-ROMs.

Particularly, the authority 105 includes a ruling module 203 that is used to define new rules (for example, implementing a solution to be deployed in the system). Each new rule is validated for its correctness; if the new rule is not in conflict to the other rules, the module 203 publishes the new rule into the corresponding repository 115.

The rule repository 115 is implemented as a Web application. In detail, a relational database 209 stores all the rules currently in force. An engine 212 controls the execution of different management operations on the database 209 (for example, insertion of new rules, deletion of pre-existing rules, or extraction of selected rules). In addition, each subject 110 can register with the engine 212; for this purpose, the subject 110 submits an identifier (typically consisting of a Globally Unique Identifier, or GUID) and an indication of its category; the information about the registered subjects is stored in a catalog 215 controlled by the engine 212.

Each subject 110 includes a membership controller 218, which assigns the subject 110 to the respective category (according to its logic and/or physic characteristics). For this purpose, the membership controller 218 cooperates with one or more plug-in modules.

Particularly, a first module 221 assigns the subject 110 to a category defined according to its physic properties. For example, the physic category is specified by hardware characteristics (such as a hard disk size, a CPU model, or a working memory capacity) and/or software characteristics (such as installed applications, files or folders). For this purpose, the module 221 leverages a hardware inventory scanner, a software inventory scanner and an application scanner (not shown in the figure).

A different module 224 statically assigns the subject 110 to a category defined according to its logical properties. For example, the static logical category specifies different groups of users (such as secretaries, managers, developers, system engineers) or different characteristics of physic entities (such as desktops, laptops, PDAs, mobile telephones); the static logical category of the subject 110 is derived from an identification code that is input during a log-in procedure or is hardwired.

Another module 227 dynamically assigns the subject 110 to a category defined according to further logical properties. For example, the dynamic logical category specifies a current function of the subject 110 in the system (such as server or agent in a monitoring application, depot in a software distribution application, and the like).

The dynamic logical categories of the different subjects 110 are set by a configuration module 230 running on the administrator 120. For this purpose, the configuration module 230 accesses an inventory 233 (for example, storing information about the organization of a company wherein the system is implemented). The information specifying the dynamic logical categories assigned to the subjects 110 is then published into the corresponding repository 125.

The logical data repository 125 (implemented as a Web application) includes a relational database 236 storing the category information; an engine 239 controls the database 236. Each subject 110 (denoted by the corresponding GUID) can register with the engine 239; the information about the registered subjects 110 is stored in a catalog 242 controlled by the engine 239. The module 227 directly interfaces with the engine 239, in order to retrieve the information defining the dynamic logic category of the subject 110.

The membership controller 218 drives a membership provider 245. The membership provider 245 publishes information specifying the category of the subject (physic category, static logic category and/or dynamic logic category) into the corresponding repository 130. The membership data repository 130 (implemented as a Web application) includes a relational database 248 storing the membership information; an engine 251 controls the database 248. In addition, the engine 251 also interfaces with the configuration module 230 running on the administrator 120.

The membership controller 218 further supplies the information identifying the category of the subject 110 to a compliance engine 254. The compliance engine 254 retrieves the rules associated with the category of the subject 110 from the corresponding repository 115 (through the engine 212). The retrieved rules are stored into a log 257 and then applied on the subject 110. For this purpose, the compliance engine 254 interfaces with a class loader 260, which is used to load the classes 263 of the required resources on the subject 110 (from one or more repositories, not shown in the figure). Each resource class 263 controls a state catalog, which specifies the current state of each resource under management. The resource class 263 further accesses a transition table; for each resource controlled by the subject 110 and for each pair current state/desired state, the transition table indicates one or more management actions required for bringing the resource from the current state to the desired state.

The compliance engine 254 also leverages the membership provider 245 in order to identify the subjects belonging to the category specified in any external formal parameter (included in the rules to be applied on the subject 110). In addition, the engine 254 supplies information indicative of the compliance of the subject 110 to each corresponding rule to the membership provider 245. The information is published into the membership data repository 130 (under the control of the engine 251).

Similar considerations apply if a whole application (consisting of the programs on the different computers) and the corresponding data are structured in a different manner, or if other modules or functions are provided. Moreover, the concepts of the present invention are also applicable when the new rules are not validated (with the correctness of the rules that is verified by the subjects directly before their application), or when the shared repositories are implemented with different technologies. Alternatively, the categories are based on other characteristics of the subjects, the physical and/or logical characteristics of the subjects are detected in a different manner, or the categories are defined in another way (for example, with a different number and/or type of components, down to a single one).

Figure 3A:
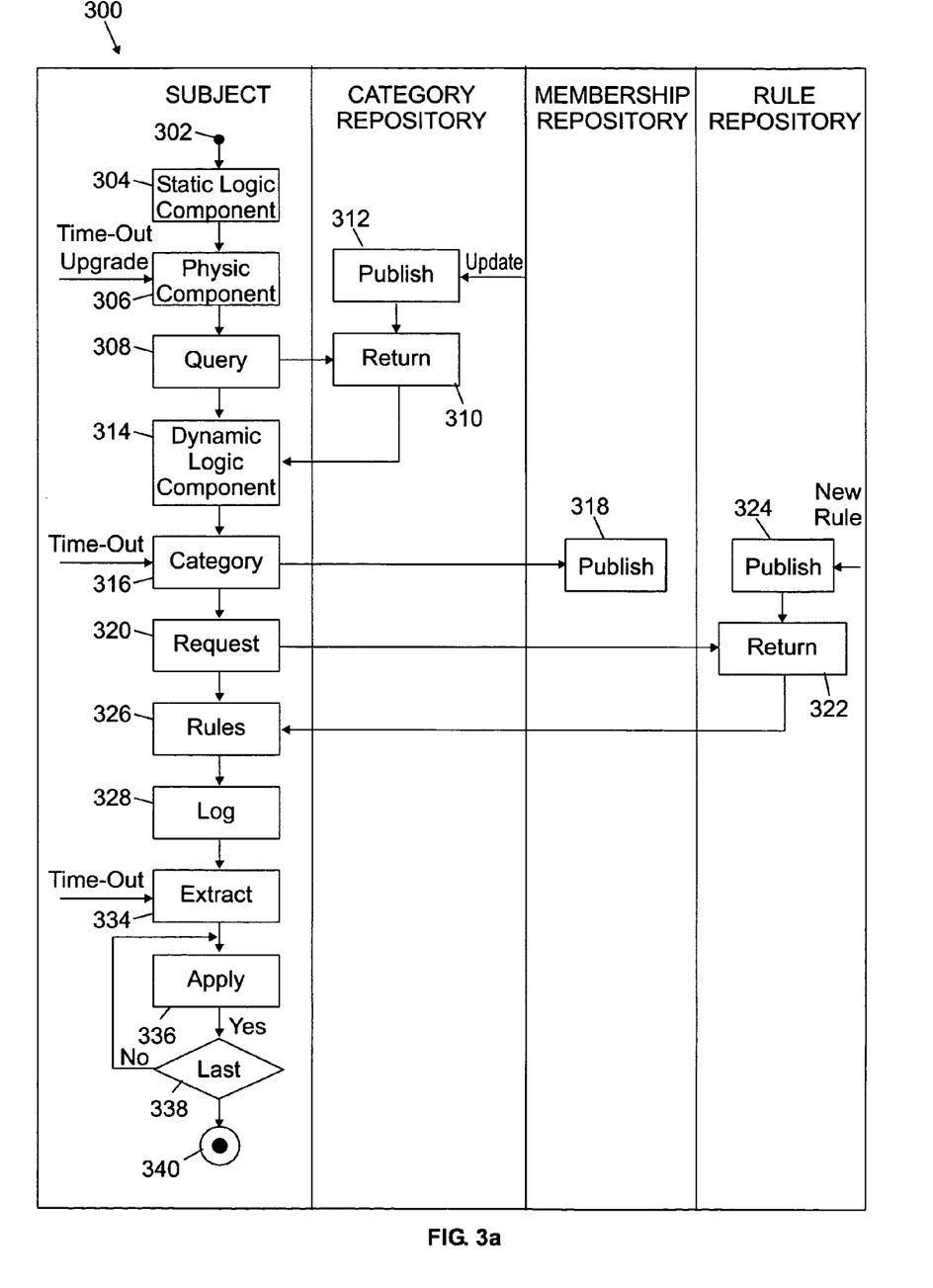
FIG. 3a is a high level flow diagram of a process of self-configuration by a subject in the system.

In the system described above, each subject self-adapts to the rules published by the authority. As shown in FIG. 3a, a corresponding process 300 begins at start circle 302 (in the Subject column). Descending into block 304, the subject derives its static logic category from the identification code that is input during the log-in procedure or is hardwired.

Hardware and software scans are then executed at block 306 (assuming that the rules for installing the corresponding modules have already been applied) in order to detect the physic category of the subject; the same activities are also performed in response to the notification of a software and/or hardware upgrade carried out on the subject.

The process continues to block 308, wherein the subject queries the logical data repository in order to identify its dynamic logic category. In response thereto, the engine of the logical data repository at block 310 retrieves the corresponding information from its database; the category information is then returned to the subject. Block 310 is also reached from block 312 (in the Category Repository column) whenever updated information is published in the logical data repository for the subject (under the control of the administrator); in this way, the subject is promptly notified of any change in its dynamic logical category (assuming that the subject has previously registered with the logical data repository). Returning to the Subject column, the category information is received from the corresponding repository at block 314.

Considering now block 316, information identifying the category of the subject (static logic category, physical category and dynamic logic category) is supplied to the membership data repository. The same activity is also performed whenever a predetermined time-out expires (for example, every hour). If the category has changed since a last verification, the information about the new category of the subject is published in the database of the membership data repository at block 318.

Referring back to the Subject column, the rules corresponding to the category of the subject are requested to the rule repository at block 320. In response thereto, the engine of the rule repository at block 322 retrieves the relevant rules from its database; the rules are then returned to the subject so as to implement a pull mode of operation. The block 322 is also reached from block 324 (in the Rule Repository column) whenever new rules are published for the category of the subject (under the control of the authority); in this way, the subject is promptly notified of any new rule applying to its category (assuming that the subject has previously registered with the rule repository) so as to implement a push mode of operation. The process proceeds to block 326 in the Subject column, wherein the rules corresponding to the category of the subject are received from the respective repository. The received rules are then logged on the subject at block 328.

Considering now block 334, all the rules are extracted from the log. The same activity is also performed whenever a predetermined time-out expires (for example, every day). Each rule, starting from the first one, is applied on the subject at block 336 (as described in detail below). A test is made at decision block 338 to verify whether the last rule has been processed. If not, the process returns to block 336 in order to apply a next rule. Conversely, as soon as all the rules have been applied the process ends at block 340. In this way, the new rules are applied on the subject as soon as they are received; in addition, all the rules are periodically reapplied so as to implement a healing mode of operation.

Figure 3B:
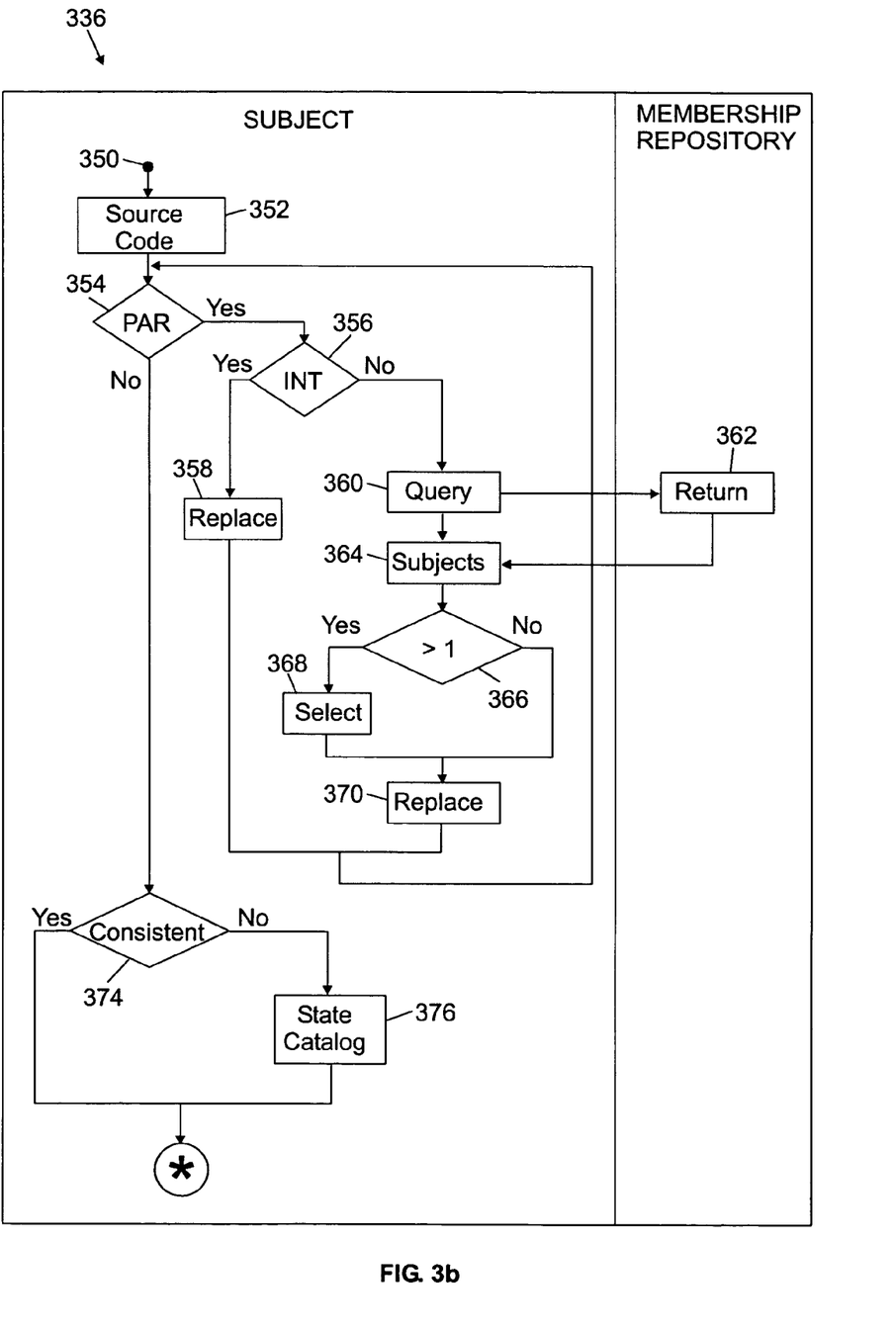
FIGS. 3b-3c depict an activity diagram specifying the application of a rule on the subject.
Figure 3C:
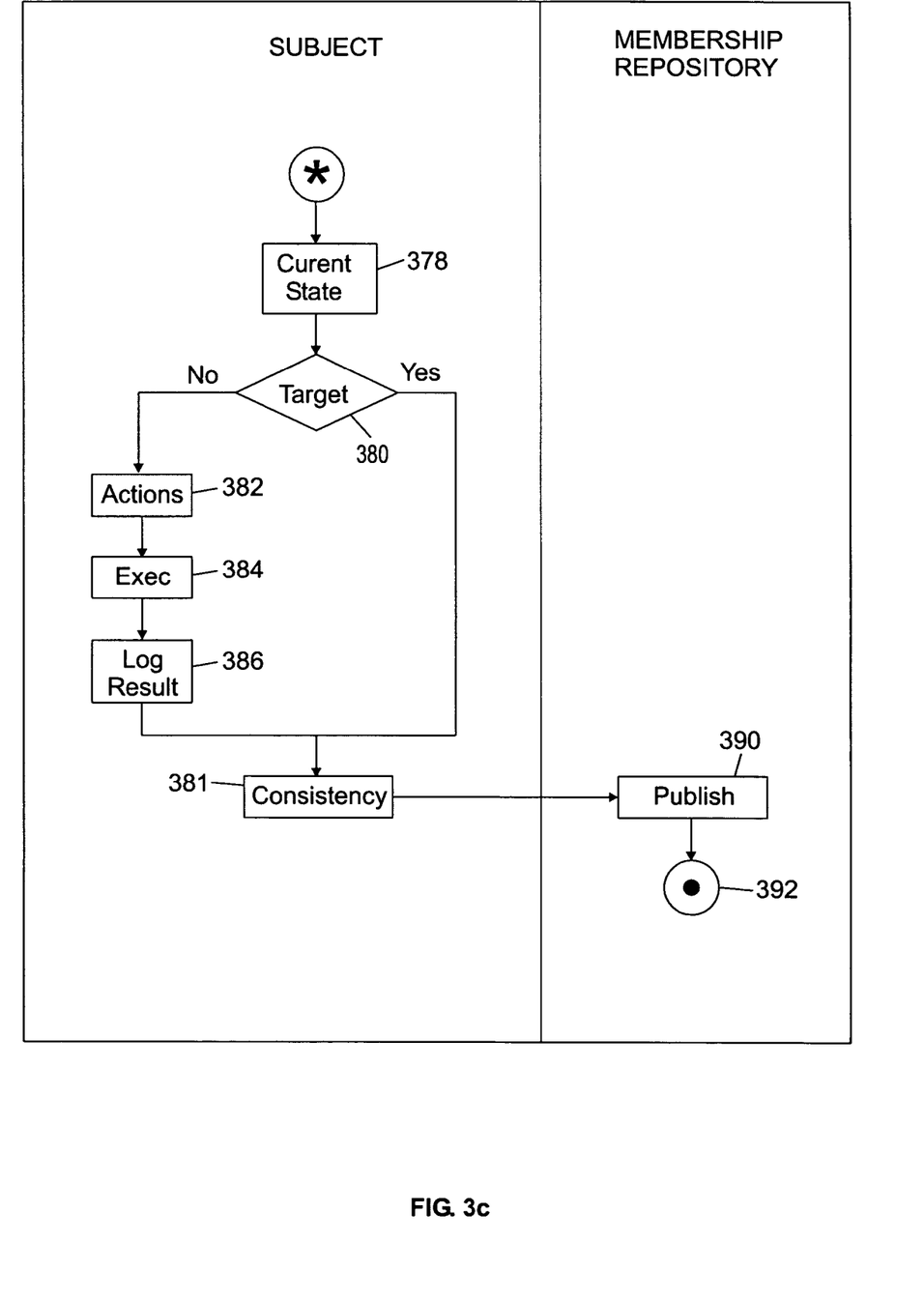

Moving now to FIGS. 3b-3c, the application of each rule on the subject implements a process that expands upon block 336 of FIG. 1 described above. The activity flow of the process begins at the start circle 350 in the Subject column. Descending into block 352, the definition of the rule is parsed. Whenever a formal parameter is encountered (decision block 354), the formal parameter is resolved, executing blocks 356-370. Particularly, the process branches at decision block 356. If the formal parameter is internal (i.e., it defines an operational feature for the category specified in the rule), the process descends into block 358. The internal formal parameter is replaced by, or bound to, the corresponding operational feature of one or more instances of a resource matching the category specified in the rule. Conversely, if the formal parameter is external (i.e., it defines a correlation with another category), blocks 360-370 are executed.

In detail, information about the subjects belonging to the correlation category (specified in the formal parameter) is requested to the membership data repository at block 360. In response thereto, the engine of the membership data repository at block 362 retrieves the relevant information from its database, which information is then returned to the subject. A list of the subject(s) belonging to the correlation category (if any) is received on the subject at block 364. A test is made at decision block 366 to verify the number of the correlation subjects. If the number is higher than one, the correlation subjects of interest are selected at block 368; for example, some applications require the identification of a single correlation subject (such as the first one), whereas other applications allow the use of all the correlation subjects. The method then passes to block 370. Conversely, when only a single subject belongs to the correlation category, the flow of activities descends into block 370 directly. Considering now block 370, the formal parameter is resolved associating the correlation category with each one of the (selected) subjects belonging to such category.

Once the internal or external formal parameter has been resolved (block 358 or block 370, respectively), the process returns to block 354 in order to continue the parsing of the definition of the rule. As soon as the parsing has been completed (i.e., all the formal parameters have been processed or the rule does not include any formal parameter), the flow of activity descends into block 374.

Referring now to block 374, the subject verifies whether the resource specified in the rule is in an inconsistent condition. If so, the corresponding entry of the state catalog is updated accordingly at block 376; the process then continues to block 378. Conversely, the process descends into block 378 directly. In this way, the subject can self-repair its configuration (restoring the correct desired state of any resource). For example, let us assume that a component of an application installed on the subject (such as a file) has been removed by mistake or during installation of another application. In this case, the verification of the rule used to install the application detects the change and sets the state of the application accordingly; as a consequence, when the rule is reapplied, the actions required to restore the missing file of the application will be performed automatically.

Considering now block 378, the current state of the resource is detected. The process then branches at block 380. If the resource is already in the desired state defined in the rule, no action is required, and the process descends into block 381, which is described below. Otherwise, the process continues to block 382, wherein a list of the actions needed to bring the resource to the desired state from the current state is extracted from the transition table. Proceeding to block 384, the actions are executed on the subject. The result of the application of the rule is then logged at block 386, and the process descends into block 381.

Moving to block 381, information about the compliance of the subject to the rule is transmitted to the membership data repository; the information indicates whether the corresponding resource controlled by the subject is in the desired state defined by the rule or not (i.e., whether the application of the rule has been completed successfully or has failed). In response thereto, the process continues to block 390 in the Membership Repository column, wherein the information corresponding to the subject is updated accordingly. The process then ends at the concentric white/black stop circles 392.

Similar considerations apply if equivalent processes are executed, if additional functions are provided, or if each time-out has a different duration. Moreover, the concepts of the present invention are also applicable when the subjects operate in another way (for example, only in the pull mode or only in the push mode), or when the application of the rules on the subjects involves different operations. Alternatively, in a more sophisticated embodiment of the invention, the correlation subjects are selected according to different criteria (for example, their location or workload), and the like.

Figure 4:
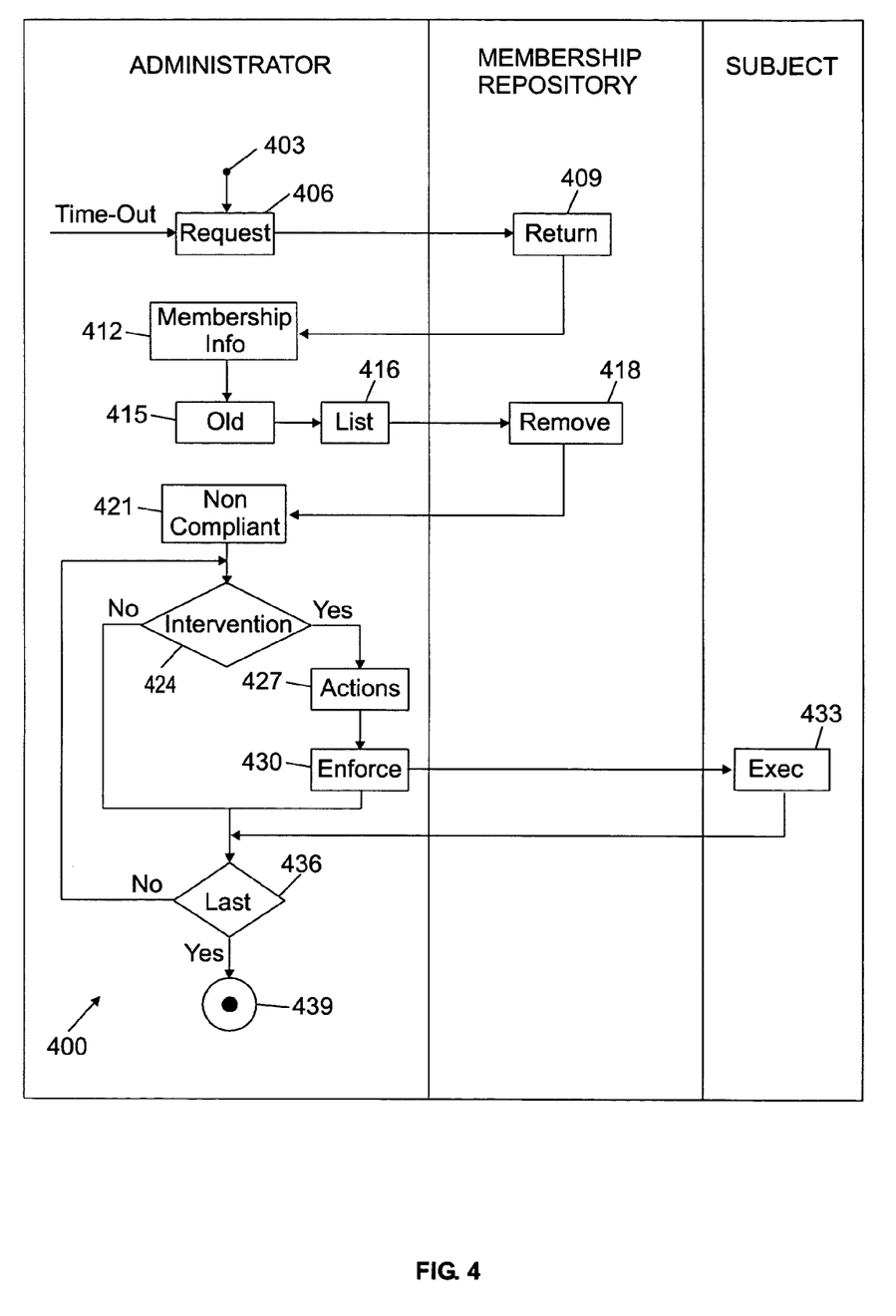
FIG. 4 illustrates an activity diagram relating to operation of an administrator in the system.

Moving now to FIG. 4, an additional process 400 is performed under the control of the administrator. The process begins at the black start circle 403 in the Administrator column, and then passes to block 406 in response to the expiration of a predetermined time-out (for example, every day). The administrator requests the membership information for all the registered subjects to the corresponding repository. In response thereto, the engine running on the membership data repository at block 409 extracts and returns the information stored in its database. The membership information is received by the administrator at block 412.

With reference now to block 415, the administrator selects the membership information older than a predefined threshold value (for example, 15 days). For this purpose, the administrator leverages a time stamp provided by each subject to the membership data repository whenever the subject publishes its membership information (i.e., whenever the subject is turned on or periodically, so as to simulate a heartbeat).

The process continues to block 416, wherein a list of the subjects identified in the membership information older than the threshold value is notified to the membership data repository. In response thereto, the corresponding information is removed from the database of the membership data repository at block 418. In this way, the membership data repository is periodically cleaned-up, deleting the information relating to subjects that have been removed from the system. It should be noted that the algorithm described above also deletes the information relating to subjects that are simply inoperative for a long time. However, whenever one of those subjects is turned-on again, the corresponding membership information is promptly republished.

The flow of activities continues to block 421 in the swim-lane of the administrator, wherein the subjects that are non-compliant with any rules corresponding to their category are identified. For each non-compliant subject (starting from the first one), the process branches at block 424. If an intervention on the non-compliant subject is desired (and possible), the process descends into block 427; one or more correction actions required to allow the application of each failed rule are identified (either automatically or manually). Proceeding to block 430, the correction actions are enforced on the non-complaint subject. In response thereto, the non-complaint subject executes the correction actions (and reports the result of the execution to the administrator). The process then continues to block 436 in the Administrator column as described below. Referring back to block 424, if no intervention is required on the non-compliant subject, the process descends into block 436 directly.

For example, let us assume that a rule requesting the installation of an application has failed because of a lack of memory space; in this case, the administrator can decide to delete any temporary file from the non-complaint subject, so as to increase the memory space available. As a consequence, as soon as the rule is applied again on the non-complaint subject (in the healing mode of operation), the application will be successfully installed.

Considering now block 436, the administrator verifies whether the last non-compliant subject has been processed. If not, the process returns to block 424 in order to execute the operations described above on a next non-compliant subject. As soon as all the non-compliant subjects have been processed, the flow of activity ends at stop circle 439.

Similar considerations apply if the administrator implements an equivalent algorithm, or if the information to be removed from the membership data repository is identified according to different conditions. However, the concepts of the present invention are also applicable when the failed rules are enforced in another way, or when the system includes one or more subjects operating as helpers for controlling the application of the rules on subjects that are not completely autonomous (for example, on mobile telephones). Alternatively, in a different embodiment of the present invention the process of cleaning-up the membership data repository is carried out manually (for example, when the administrator is notified that a computer has been removed from the system).

Preferably, each rule is specified in the Extensible Markup Language (XML), which allows the creation of customized tags for any desired purpose. Each rule starts with a <LAW> tag and ends with a </LAW> tag. The rule includes a first part (WHO clause), which is enclosed between the tags <WHO> and </WHO>, and a second part (WHAT clause), which is enclosed between the tags <WHAT> and </WHAT>.

The WHO clause defines the category associated with the rule by means of one or more key/value pairs. Each component of the category is specified by a tag including the key GROUP, which defines the name of the category component; this tag is followed by the actual value of the category component enclosed between the tags <constant> and </constant>. The category components can be combined with standard logical operators (such as AND, OR, NOT, and the like).

The WHAT clause describes the resource to be configured by the rule. In detail, the resource is defined between the tags <RESOURCE_DEFINITION> and </RESOURCE_DEFINITION>; for example, the rule specifies a type of the resource (enclosed between the tags <RESOURCE_TYPE> and </RESOURCE_TYPE>), a repository from which corresponding software components can be downloaded (enclosed between the tags <RESOURCE_REPOSITORY> and </RESOURCE_REPOSITORY>), the name of its class (enclosed between the tags <RESOURCE_CLASS> and </RESOURCE_CLASS>), the identification of a specific instance of the resource (enclosed between the tags <INSTANCE_IDENTIFIER> and </INSTANCE_IDENTIFIER>), and the like. The desired state of the resource under management is defined between the tags <DESIRED_STATE> and </DESIRED_STATE>.

An internal formal parameter consists of the name of an operational feature preceded by the symbol "$". Any argument of the rule is enclosed between the tags <ARGUMENT> and </ARGUMENT>. The arguments can include one or more external formal parameters to be resolved at run-time; an external formal parameter consists of the name of an operational feature preceded by the symbol "$", which name is followed by a dot and an expression identifying a category.

For example, the following rule applies to all the subjects belonging to the dynamic logic category DEPT=MyDept:

```
<LAW>
  <WHO>
    <and>
      <eq>
        <GROUP name="DEPT"/>
        <constant>MyDept</constant>
      </eq>
      <eq>
        <GROUP name="PROGRAM"/>
        <constant>MyProgram</constant>
      </eq>
      <geq>
        <GROUP name="MEMORY_SPACE"/>
        <constant>1G</constant>
      </geq>
    </and>
  </WHO>
  <WHAT>
    <RESOURCE_DEFINITION>
      <RESOURCE_TYPE>MyType</RESOURCE_TYPE>
      <INSTANCE_IDENTIFIER>$INSTANCE</INSTANCE_IDENTIFIER>
    </RESOURCE_DEFINITION>
    <DESIRED_STATE>Remove</DESIRED_STATE>
  </WHAT>
</LAW>
```

At the same time, the subjects must control one or more instances of the resource MyProgram for which a memory space greater than 1 Gbytes is allocated. The rule forces the subjects to remove those instances of the resource MyProgram. For this purpose, when the rule is applied the internal formal parameter $INSTANCE is replaced with the actual instances of the resource MyProgram matching the condition specified in the WHO clause. For example, let us assume that a subject manages three different instances of the resource MyProgram; an instance MyInstance1 has allocated 512 Mbytes, an instance MyInstance2 has allocated 2 Gbytes, and an instance MyInstance3 has allocated 624 Mbytes. Therefore, the application of the rule will result in the removing of the instance of the resource MyProgram named MyInstance2 only.

In another example, the following rule applies to all the subjects belonging to the dynamic logic category DEPT=MyDept:

```
<LAW>
   <WHO>
      <and>
         <eq>
            <GROUP name="DEPT"/>
            <constant>MyDept</constant>
         </eq>
         <eq>
            <GROUP name="MONITORING"/>
            <constant>Agent</constant>
         </eq>
      </and>
   </WHO>
   <WHAT>
      <RESOURCE_DEFINITION>
         <RESOURCE_TYPE>Monitor</RESOURCE_TYPE>
         <INSTANCE_IDENTIFER>MyMonitor</INSTANCE_IDENTIFIER>
      </RESOURCE_DEFINITION>
      <DESIRED_STATE>Running</DESIRED_STATE>
      <ARGUMENT>$IP.(Server=MONITORING)</ARGUMENT>
   </WHAT>
</LAW>
```

At the same time, the subjects must have been selected to operate as agents in a monitoring application, with the installation of a corresponding instance of a monitor (MyMonitor). The rule forces the subjects to have the monitor instance MyMonitor running; the monitor instance MyMonitor is then configured to point to the IP address of a subject operating as a server. The IP address of the server is determined at run-time, resolving the external formal parameter $IP; in other words, when the rule is applied the IP address of the subject belonging to the category Server=MONITORING is retrieved from the membership data repository, and it is substituted for the external formal parameter. For example, assuming that the current IP address of the subject operating as the monitoring server is MyAddress, the agent will be configured to transmit the collected monitoring information to that IP address.

Figure 5:
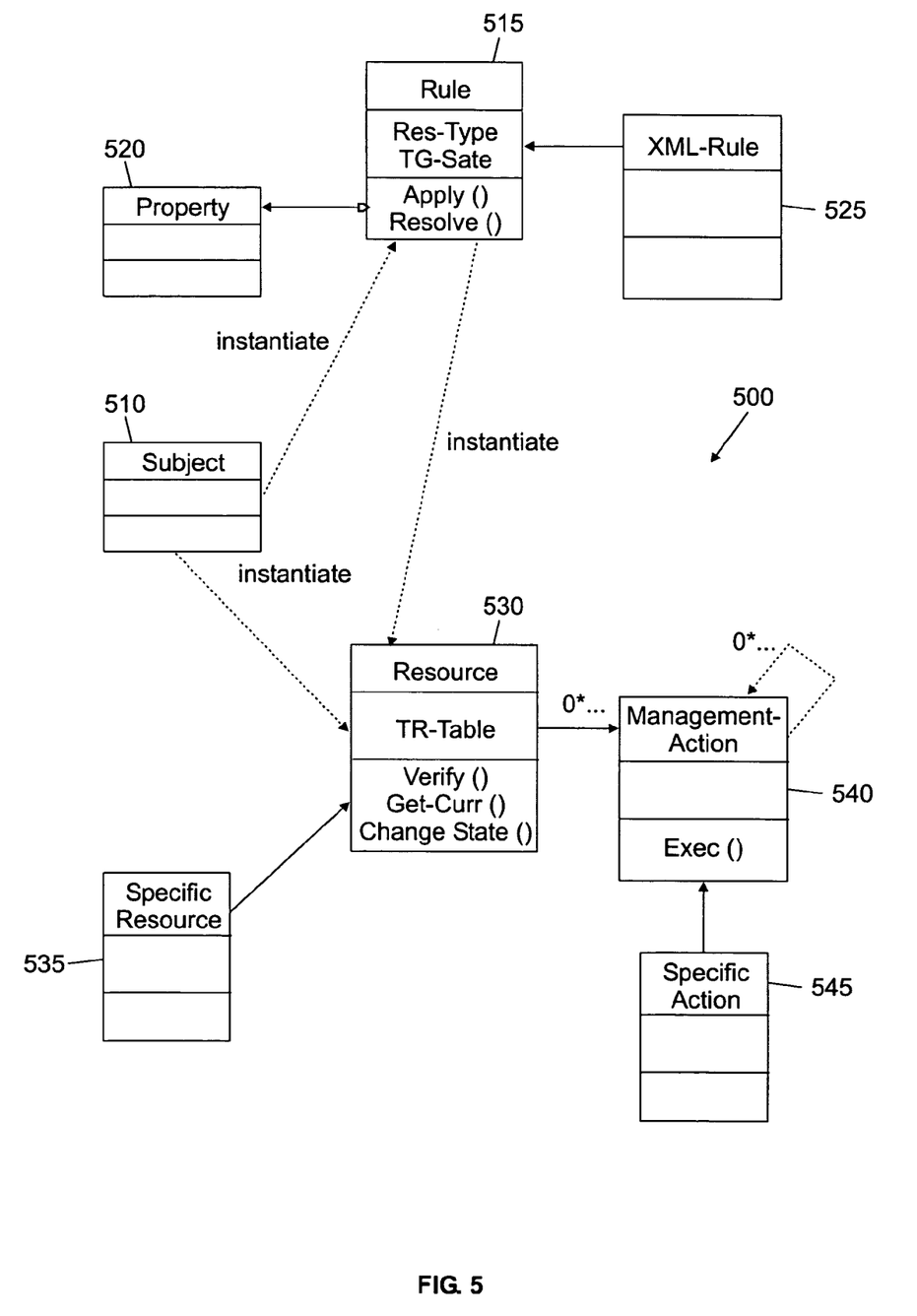
FIG. 5 depicts a class diagram implementing the management method.

The above-described management environment is preferably implemented with a software application that is written in an object-oriented language (such as Java). As shown in FIG. 5, a corresponding class diagram 500 includes a class SUBJECT 510 (representing a generic subject in the system). The class SUBJECT 510 instantiates objects of a class RULE 515, which represents a generic rule published by the authority. The class RULE 515 has a private attribute RES_TYPE (specifying the class name of the corresponding resource) and a private attribute TG_STATE (specifying the desired state of the resource). Moreover, the class RULE 515 exposes a public method APPLY for implementing the rule on the subject; a private method RESOLVE is used to replace any formal parameter of the rule with the corresponding actual value.

The class RULE 515 has a collection consisting of any number of objects instantiating a class PROPERTY 520; each one of these objects includes additional information needed to apply the rule. A class XML_RULE 525 extends the class RULE 515; the class XML_RULE 525 defines an actual implementation of the rule.

The class RULE 515 and the class SUBJECT 510 instantiate objects implementing an interface RESOURCE 530, which represents a generic resource under management. The interface RESOURCE 530 declares an abstract attribute TR_TABLE for the corresponding transition table; moreover, the interface RESOURCE 530 exposes a public method VERIFY (for validating the state of the resource), a public method GET_CURR (returning the current state of the resource), and a public method CHANGE_STATE (for bringing the resource to the desired state from the current state).

The interface RESOURCE 530 is implemented by concrete classes 535 (generically denoted with SPECIFIC_RESOURCE), each one corresponding to a different type of resource (such as a file, a directory, a software package, a monitoring activity, and so on). Each class SPECIFIC_RESOURCE 535 defines the content of the transition table in the attribute TR_TABLE.

The interface RESOURCE 530 is further associated with any number of objects implementing an interface MANAGEMENT_ACTION 540 (which in turn is recursively associated with itself). The interface MANAGEMENT_ACTION 540 exposes a public method EXEC (for performing the required operations on the subject). The interface MANAGEMENT ACTION 540 is implemented by concrete classes 545 (generically denoted with SPECIFIC_ACTION), each one corresponding to a different type of management action (such as add, remove or change the attributes of a file/directory, install, remove or restore a software package, trigger or stop a monitoring activity, and so on). Each class SPECIFIC_ACTION 545 actually defines the method EXEC.

The application of a generic rule involves the instantiation of an object of the type XML_RULE (passing the corresponding XML definition as a parameter) followed by the calling of the method APPLY. At first, the method APPLY calls the method RESOLVE (in order to substitute the actual values for any formal parameters of the rule). The method APPLY then instantiates an object of the type SPECIFIC_RESOURCE (whose name is stored in the attribute RES_TYPE). This method in sequence calls the method VERIFY and the method GET_CURR on the object of the type SPECIFIC_RESOURCE; the method CHANGE_STATE is then called passing the current state (returned by the method GET_CURR) and the desired state (stored in the attribute TG_STATE) as parameters. The method CHANGE_STATE queries the transition table (stored in the attribute TR_TABLE) in order to determine the required management actions. One or more objects of the corresponding type SPECIFIC_ACTION are instantiated, and the method EXEC is called on every one of them.

However, the concepts of the present invention are also applicable when the rules are defined in a different way (for example, using a tuple space) or when the software application implementing the management environment is written in a different language (even a non-object-oriented one). Similar considerations apply if the rules have a different structure, if other classes, interfaces, attributes and/or methods are envisaged, and the like.

Figure 6:
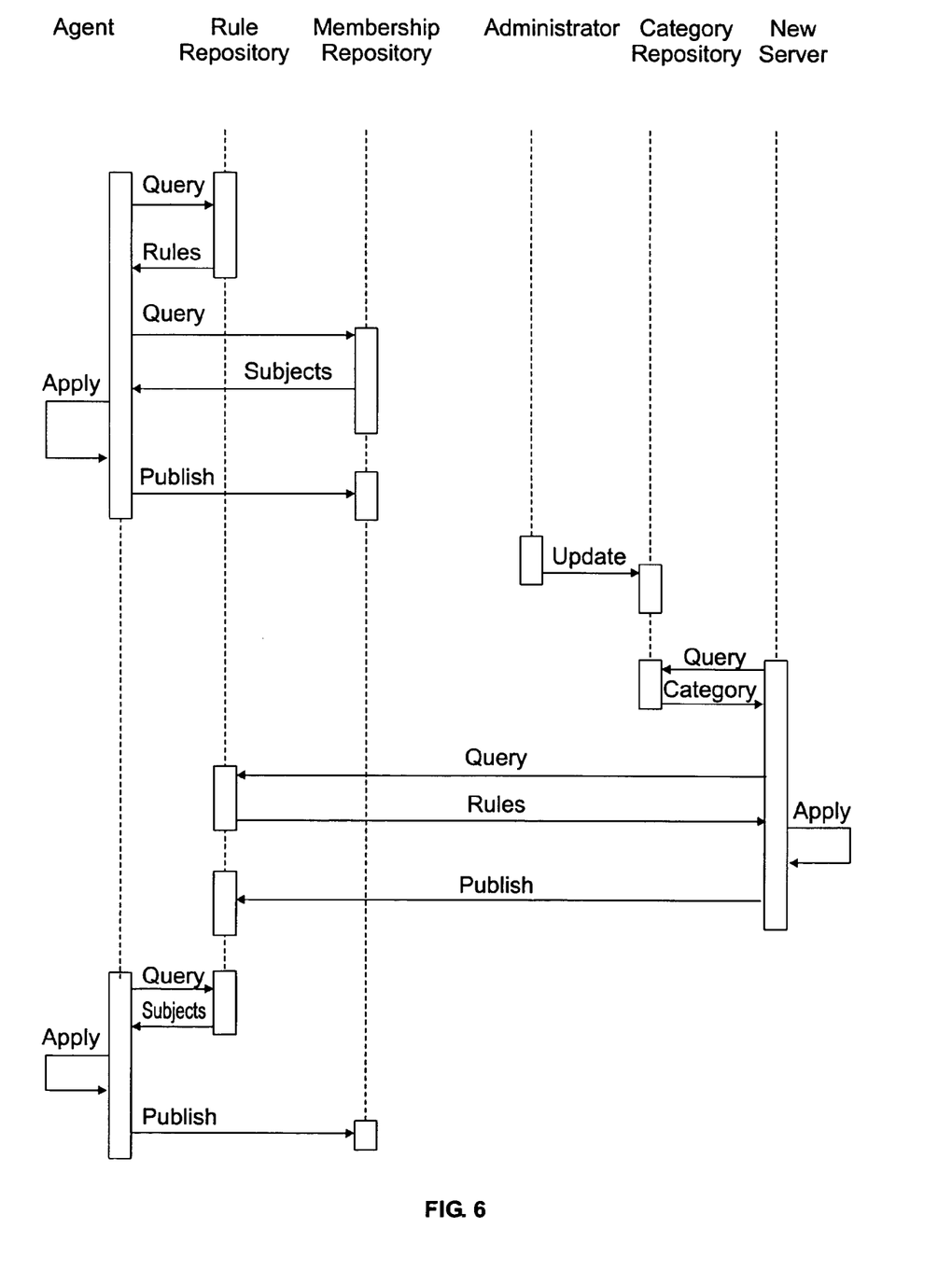
FIG. 6 is a sequence diagram exemplifying a specific management operation.

An example of a scenario involved by the rule described in the foregoing for the monitoring agents is illustrated in the sequence diagram of FIG. 6. A generic agent begins the sequence of operations (when turned-on) requesting the rules associated with its category to the rule repository (i.e., the rule cited above in the example at issue). The agent starts processing the received rule requesting the IP address of the subjects belonging to the category Server-MONITORING to the membership data repository. As soon as the requested information is received, the monitoring application is installed on the agent and configured to point to the IP address of the server. The agent then publishes its membership information into the corresponding repository.

We now assume that the server is removed from the system (with the corresponding information that is deleted from the membership data repository). The administrator selects a new subject for operating as the server and publishes the corresponding information into the membership data repository. Such a subject periodically queries the membership data repository and then updates its category accordingly. In response thereto, the new server requests the rules associated with its category to the rule repository. The received rules are then applied on the new server to install the monitoring application. The new server publishes its membership information into the corresponding repository.

The rules retrieved on the agent are periodically re-applied. In this case, when the agent requests the IP address of the subjects belonging to the category Server=MONITORING to the membership data repository, the IP address of the new server is returned. Therefore, the monitoring application running of the agent is re-configured so as to point to the new server correctly. The agent then publishes its membership information into the corresponding repository.

Similar considerations apply to different scenarios relating to alternative applications and involving other rules and/or subjects.

The management environment described above implements an adaptive model, which can be compared to the behavior of the human society. In the human society a central authority (such as a parliament) enacts a series of laws for the citizens. Each law has a general character and defines different provisions for corresponding categories of citizens. For example, a law establishes a series of tax rates, each one to be applied for a corresponding income range; moreover, the law specifies that an income-tax return must be filled-in with the personal information of the taxpayer and then provided to an authorized agency.

The parliament publishes the laws using an official bulletin. Every citizen has the responsibility to remain up-to-date with the laws. In this way, the citizen can calculate the taxes to be paid applying the rate corresponding to his/her income and then fill-in the income tax return with his/her personal information. Moreover, each agency publishes its address in the telephone directory; the citizen can then look up the addresses of the agencies and select the more convenient one (for example, the agency closest to his/her residence). In this way, the parliament does not need to know any information about either the citizens or the agencies; at the same time, the actual address of the more convenient agency can be determined directly by every citizen when necessary.

The proposed solution clearly distinguishes from the enforcement model implemented by the resource management environments known in the art. Referring again to the parallel with the civil society, a central authority (such as a gas company) collects information about the conditions of every user; the central authority then issues a series of measures, each one individually tailored to the condition of the corresponding user. For example, the gas company detects the consumption of every user through a meter reading, and then issues a respective invoice (wherein the amount to be paid is calculated according to the consumption). The invoice is sent to the user, which has a pre-set period of time for paying the amount of the invoice with a money transfer to a bank account specified in the invoice. In this way, the gas company must collect all the required information about the customers; in addition, the bank account must be specified in advance in any invoice.

In other words, the proposed model provides an autonomic computing implementation of the management environment. The term autonomic comes from an analogy to the autonomic central nervous system in the human body, which adjusts to many situations automatically without any external help.

Likewise, in the proposed management environment, each subject is able to configure, tune and repair itself, as well as anticipate and solve performance problems automatically; at the same time, any correlation among different subjects can be established dynamically by the subjects themselves.

More generally, the present invention proposes an autonomic management method for a data processing system; the system includes a plurality of subject entities and one or more authority entities. The method is used for self-configuring the subject entities; each subject entity belongs to one or more of a plurality of categories. The method starts with the step of publishing a plurality of rules under the control of the authority. Each rule defines a desired state for a category; one or more of the rules include at least one formal parameter, which defines a correlation with one or more further categories. The method continues with each subject entity that retrieves the rules corresponding to its category. For each retrieved rule, the method includes the step of resolving each formal parameter included in the retrieved rule; for this purpose, each further category specified in the formal parameter is associated with one or more further subject entities belonging to the further category. The retrieved rule is then applied, in order to configure the subject entity according to the desired state specified in the retrieved rule.

The solution of the invention provides a management method that implements a self-adaptive model. In this way, the subjects are no longer passive entities, but instead actively participate in the management process.

The proposed method makes it possible to define correlations between different subjects dynamically at run-time.

In the management environment of the invention, each correlation is established at a logical level; using this technique, it is then possible to provide rules (irrespective of the actual system structure) that automatically configure the subjects according to the physical environment wherein they actually operate.

The resulting management environment is very flexible; therefore, the complexity of any solution to be deployed in the system is significantly reduced. These advantages are clearly perceived in high dynamic environments in which the configuration of the subjects changes frequently (even if different applications are not excluded).

It should be noted that this result can be achieved reusing components already available in known management environments (based on the enforcement model). Indeed, the method of the invention only changes the way these components are used, not their operation.

The preferred embodiment of the invention described above offers further advantages. Particularly, the membership information is published in a shared repository (which is accessed whenever a formal parameter must be resolved). In addition, the proposed architecture provides a complete decoupling of the subjects implementing the correlation; this structure is especially advantageous when the subjects are spatially dispersed in different locations. Furthermore, in a specific embodiment of the invention, the resolution of the formal parameter involves the selection of one or more of the correlation subjects. This feature ensures the general applicability of the proposed method in any situation. However, the solution according to the present invention lends itself to be implemented with subjects that request membership information from the administrator directly or even without supporting multiple correlation subjects (for example, with the membership data repository that always returns the indication of a single subject belonging to the correlation category).

As a further enhancement, every subject also publishes information about its compliance to the corresponding rules (in the membership data repository). This information can be used to monitor the actual condition of the system. Particularly, the above-mentioned information is used by the administrator to enforce the execution of correction actions on any non-compliant subjects. This additional feature makes it possible to act remotely on the non-complaint subjects, so as to allow the successful application of the failed rules later on.

A way to further improve the solution is to remove the membership information (from the corresponding repository) when it is older than a threshold value. In this way, the membership data repository can be periodically cleaned up, so as to delete information about subjects that have been removed from the system. Alternatively, no compliance information is published, no enforcement of correction actions on the non-complaint subjects is supported, or no function is provided for cleaning up the membership data repository automatically.

In a preferred embodiment of the present invention, each subject also operates in a healing mode. In this way, any change of the subjects belonging to the correlation category is automatically reflected to all the subjects, wherein the corresponding rule has already been applied.

Advantageously, some of the categories are defined according to dynamic logic characteristics. The proposed structure allows the administrator to control the actual implementation of any correlation in a very simple way.

As a further enhancement, the rules can include internal formal parameters. This additional feature provides an effective mechanism for addressing different instances of a resource controlled by the subject. However, the solution according to the present invention is also suitable to be implemented with the subjects that operate in a different mode, with other components of the category, and even without supporting any internal formal parameter.

Advantageously, the solution according to the present invention is implemented with a computer program, which is provided as a corresponding product stored on a suitable medium. Moreover, it should be noted that the component of the program running on each subject is suitable to be implemented separately and put on the market even as a stand-alone product. Alternatively, the program is pre-loaded onto the hard disks, is sent to the computers through a network (typically the INTERNET), is broadcast, or more generally is provided in any other form directly loadable into a working memory of the computers. However, the method according to the present invention leads itself to be carried out even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

What is claimed is:

1. An autonomic management method for self-configuring a subject entity in a data processing system, wherein the subject entity belongs to at least one of a plurality of categories, said method comprising:
the subject entity retrieving, from a set of rules published by an authority entity, one or more rules corresponding to the at least one category of the subject entity, wherein each rule defines a desired state for a category and at least one retrieved rules includes at least one formal parameter defining a correlation with at least one further category;
for each retrieved rule, the subject entity:
resolving each formal parameter included in the retrieved rule by associating each further category specified in the formal parameter with at least one further subject entity belonging to the further category; and
applying the retrieved rule to configure the subject entity according to the desired state specified in the retrieved rule.

2. The method according to claim 1, wherein:
said method further comprises the subject entity publishing membership information including an indication of the at least one category of the subject entity in a shared memory space; and
resolving each formal parameter comprises retrieving an indication of the at least one further subject entity belonging to each further category specified in the formal parameter from the shared memory space.

3. The method according to claim 2, wherein:
for at least one further category, the at least one further subject entity belonging to the further category consists of a plurality of further subject entities; and
said resolving each formal parameter further comprises selecting at least one of the further subject entities.

4. The method according to claim 2, wherein:
the membership information for each subject entity further includes an indication of a compliance of the subject entity to each retrieved rule; and
the method further comprises publishing, in the shared memory space, the indication of the compliance of the subject entity to each retrieved rule in response to the application of the retrieved rule.

5. The method according to claim 4, and further comprising:
an administrator entity querying the shared memory space to verify the compliance of each subject entity to each retrieved rule, and
the administrator entity enforcing the execution of at least one correction action on the subject entity in response to a negative verification.

6. The method according to claim 2, wherein:
said step of publishing the membership information in the shared memory space is performed periodically; and
the method further comprises an administrator entity removing the membership information older than a threshold value from the shared memory space.

7. The method according to claim 1, further comprising the subject entity re-applying at least one retrieved rule.

8. The method according to claim 1, wherein at least one category includes a dynamic logic category, the method further comprising:
publishing an indication that the subject entity belongs to each dynamic logic category in a further shared memory space, and
the subject entity retrieving an indication of each dynamic logic category of the subject entity from the further shared memory space.

9. The method according to claim 1, wherein:
at least one of the rules includes at least one further formal parameter specifying an operational feature for the category specified in the rule; and
said method comprises the subject entity resolving each further formal parameter included in each retrieved rule by associating the further formal parameter with the corresponding operational feature of at least one instance of a resource controlled by the subject entity, the at least one instance being identified by the category specified in the retrieved rule.

10. The method of claim 1, and further comprising an authority entity publishing the rule set for access and rule retrieval by a plurality of subject entities.

11. A program product for self-configuring a subject entity in a data processing system, wherein the subject entity belongs to at least one of a plurality of categories, said program product comprising a computer-readable medium bearing instructions that cause the subject entity to perform the steps of:
- retrieving, from a set of rules published by an authority entity, one or more rules corresponding to the at least one category of the subject entity, wherein each rule defines a desired state for a category and at least one retrieved rules includes at least one formal parameter defining a correlation with at least one further category;
- for each retrieved rule:
  - resolving each formal parameter included in the retrieved rule by associating each further category specified in the formal parameter with at least one further subject entity belonging to the further category; and
  - applying the retrieved rule to configure the subject entity according to the desired state specified in the retrieved rule.

12. The program product according to claim 11, wherein said program product further comprises instructions for causing the subject entity to perform the steps of:
- publishing membership information including an indication of the at least one category of the subject entity in a shared memory space; and
- resolving each formal parameter comprises retrieving an indication of the at least one further subject entity belonging to each further category specified in the formal parameter from the shared memory space.

13. The program product according to claim 12, wherein:
- for at least one further category, the at least one further subject entity belonging to the further category consists of a plurality of further subject entities; and
- said resolving each formal parameter further comprises selecting at least one of the further subject entities.

14. The program product according to claim 12, wherein:
- the membership information for each subject entity further includes an indication of a compliance of the subject entity to each retrieved rule; and
- the program product further comprises instructions for causing the subject entity to perform the step of publishing, in the shared memory space, the indication of the compliance of the subject entity to each retrieved rule in response to the application of the retrieved rule.

15. The program product according to claim 14, and further comprising instructions for causing an administrator entity to perform the steps of:
- querying the shared memory space to verify the compliance of each subject entity to each retrieved rule, and
- enforcing the execution of at least one correction action on the subject entity in response to a negative verification.

16. The program product according to claim 12, wherein:
- said step of publishing the membership information in the shared memory space is performed periodically; and
- the program product further comprises instructions for causing an administrator entity to remove membership information older than a threshold value from the shared memory space.

17. The program product according to claim 11, further comprising instructions for causing the subject entity to re-apply at least one retrieved rule.

18. The program product according to claim 11, wherein at least one category includes a dynamic logic category, the program product further causes the subject entity to perform the steps of:
- publishing an indication that the subject entity belongs to each dynamic logic category in a further shared memory space, and
- retrieving an indication of each dynamic logic category of the subject entity from the further shared memory space.

19. The program product according to claim 11, wherein:
- at least one of the rules includes at least one further formal parameter specifying an operational feature for the category specified in the rule; and
- said program product further causes the subject entity to resolve each further formal parameter included in each retrieved rule by associating the further formal parameter with the corresponding operational feature of at least one instance of a resource controlled by the subject entity, the at least one instance being identified by the category specified in the retrieved rule.

20. The program product of claim 11, and further comprising instructions for causing an authority entity to publish the rule set for access and rule retrieval by a plurality of subject entities.

21. A self-configuring subject entity in a data processing system, wherein the subject entity belongs to at least one of a plurality of categories, said subject entity comprising:
- a communication port through which said subject entity can access a rule set published by an authority entity, wherein one or more rules corresponding to at least one category of the subject entity, wherein each rule defines a desired state for a category and includes at least one formal parameter defining a correlation with at least one further category;
- a processor coupled to the communication port;
- data storage storing instructions for causing the subject entity to perform the steps of:
- retrieving at least one rule from the rule set via the communication port;
- for each retrieved rule:
  - resolving each formal parameter included in the retrieved rule by associating each further category specified in the formal parameter with at least one further subject entity belonging to the further category; and
  - applying the retrieved rule to configure the subject entity according to the desired state specified in the retrieved rule.

22. The subject entity according to claim 21, wherein said data storage further comprises instructions for causing the subject entity to perform the steps of:
- publishing membership information including an indication of the at least one category of the subject entity in a shared memory space; and
- resolving each formal parameter comprises retrieving an indication of the at least one further subject entity belonging to each further category specified in the formal parameter from the shared memory space.

23. The subject entity according to claim 22, wherein:
- for at least one further category, the at least one further subject entity belonging to the further category consists of a plurality of further subject entities; and
- said resolving each formal parameter further comprises selecting at least one of the further subject entities.

24. The subject entity according to claim 22, wherein:

the membership information for each subject entity further includes an indication of a compliance of the subject entity to each retrieved rule; and the data storage further comprises instructions for causing the subject entity to perform the step of publishing, in the shared memory space, the indication of the compliance of the subject entity to each retrieved rule in response to the application of the retrieved rule.

25. A data processing system, comprising:

the subject entity according to claim 24;

an administrator entity that queries the shared memory space to verify the compliance of each subject entity to each retrieved rule and enforces execution of at least one correction action on the subject entity in response to a negative verification.

26. A data processing system, comprising:

the subject entity according to claim 22, wherein said subject entity publishes the membership information in the shared memory space periodically; and an administrator entity to remove membership information older than a threshold value from the shared memory space.

27. The subject entity according to claim 22, said data storage further comprising instructions for causing the subject entity to re-apply at least one retrieved rule.

28. The subject entity according to claim 21, wherein at least one category includes a dynamic logic category, the data storage further comprises instruction that causes the subject entity to perform the steps of:

publishing an indication that the subject entity belongs to each dynamic logic category in a further shared memory space, and retrieving an indication of each dynamic logic category of the subject entity from the further shared memory space.

29. The subject entity according to claim 21, wherein:

at least one of the rules includes at least one further formal parameter specifying an operational feature for the category specified in the rule; and said data storage further comprises instructions that cause the subject entity to resolve each further formal parameter included in each retrieved rule by associating the further formal parameter with the corresponding operational feature of at least one instance of a resource controlled by the subject entity, the at least one instance being identified by the category specified in the retrieved rule.

30. A data processing system, comprising:

the subject entity according to claim 21;

an authority entity that publishes the rule set for access and rule retrieval by a plurality of subject entities.

* * * * *